(12) United States Patent
Jevons (10) Patent No.: US 9,944,023 B2
(45) Date of Patent: Apr. 17, 2018

(54) METHOD OF THROUGH-THICKNESS REINFORCING A LAMINATED MATERIAL

(71) Applicant: ROLLS-ROYCE PLC, London (GB)

(72) Inventor: Matthew Paul Jevons, Derby (GB)

(73) Assignee: ROLLS-ROYCE plc, London (GB)

( * ) Notice: Subject to any disclaimer, the term of this patent is extended or adjusted under 35 U.S.C. 154(b) by 645 days.

(21) Appl. No.: 14/230,402

(22) Filed: Mar. 31, 2014

(65) Prior Publication Data

US 2014/0308135 A1    Oct. 16, 2014

(30) Foreign Application Priority Data

Apr. 10, 2013 (GB) .................. 1306479.5

(51) Int. Cl.
| | |
|---|---|
| *B29C 70/24* | (2006.01) |
| *F01D 5/28* | (2006.01) |
| *B29C 70/88* | (2006.01) |
| *B29C 65/14* | (2006.01) |
| *B29C 65/64* | (2006.01) |
| *B29L 31/00* | (2006.01) |
| *B29L 31/08* | (2006.01) |
| *B29C 65/00* | (2006.01) |

(52) U.S. Cl.
CPC ............ *B29C 70/24* (2013.01); *B29C 70/887* (2013.01); *F01D 5/282* (2013.01); *B29C 65/1425* (2013.01); *B29C 65/1467* (2013.01); *B29C 65/645* (2013.01); *B29C 66/47* (2013.01); *B29C 66/69* (2013.01); *B29C 66/721* (2013.01); *B29C 66/861* (2013.01); *B29C 66/9192* (2013.01); *B29L 2031/08* (2013.01); *B29L 2031/7504* (2013.01); *Y10T 156/1056* (2015.01)

(58) Field of Classification Search
CPC ........ B29C 70/24; B29C 70/887; F01D 5/282
See application file for complete search history.

(56) References Cited

U.S. PATENT DOCUMENTS

| | | |
|---|---|---|
| 3,997,385 A | 12/1976 | Osborne |
| 5,186,776 A | 2/1993 | Boyce et al. |
| 6,106,646 A | 8/2000 | Fairbanks |

(Continued)

FOREIGN PATENT DOCUMENTS

| | | |
|---|---|---|
| DE | 845 564 C | 8/1952 |
| JP | A-60-222230 | 11/1985 |

(Continued)

OTHER PUBLICATIONS

Sep. 19, 2014 Search Report issued in European Application No. 14162743.

(Continued)

*Primary Examiner* — Moshe Wilensky
(74) *Attorney, Agent, or Firm* — Oliff PLC (57) ABSTRACT

A method of providing through-thickness reinforcement of a laminated material which includes a matrix material including a step of creating a locally heated zone in the laminated material so as to locally soften the matrix material by focussing a set of at least two energy beams at a location where through-thickness reinforcement is required and a step of inserting a reinforcement element through the thickness of the laminated material at the location of the locally heated zone to through-thickness reinforce the laminated material.

16 Claims, 4 Drawing Sheets

(56) References Cited

U.S. PATENT DOCUMENTS

| | | | |
|---|---|---|---|
| 2003/0017053 A1 | 1/2003 | Baldwin et al. | |
| 2011/0065888 A1* | 3/2011 | Inston | B29C 35/0261 |
| | | | 528/125 |
| 2014/0183784 A1* | 7/2014 | Bartel | B29C 70/50 |
| | | | 264/258 |

FOREIGN PATENT DOCUMENTS

| | | |
|---|---|---|
| JP | H10-166450 A | 6/1998 |
| JP | H10-166453 A | 6/1998 |
| WO | WO 2009/156754 A1 | 12/2009 |
| WO | WO 2011/135267 A1 | 11/2011 |

OTHER PUBLICATIONS

Nov. 29, 2013 Search Report issued in British Application No. GB 1306479.5.

* cited by examiner

METHOD OF THROUGH-THICKNESS REINFORCING A LAMINATED MATERIAL

CROSS-REFERENCE TO RELATED APPLICATIONS

This application is based upon and claims the benefit of priority from British Patent Application Number 1306479.5 filed 10 Apr. 2013, the entire contents of which are incorporated by reference.

BACKGROUND OF THE INVENTION

1. Field of the Disclosure

The present invention relates to a method of through-thickness reinforcing a laminated material with a reinforcing element. In particular, the present invention relates to a method of heating a laminated material to insert a reinforcing element.

2. Description of the Related Art

Laminated composite materials, in which reinforcing fibres are held within a polymeric matrix, are extensively used in many engineering applications. Such materials can generally provide a higher strength and stiffness per unit weight than conventional metallic materials. This makes such composite materials advantageous for weight sensitive applications, such as those in the field of aerospace.

A known problem with laminated composite materials is their poor inter-laminar, or through-thickness, mechanical properties in comparison to the corresponding in-plane properties. Such low inter-laminar strength and fracture toughness can constrain the design of composite parts and may even limit the use of such materials for certain applications.

One solution to this problem is the use of a toughened matrix material. Such matrix materials are generally significantly more expensive than conventional matrix materials, often have poor high temperature properties and may still not provide a sufficient increase in fracture toughness.

An alternative solution to improving inter-laminar strength properties is the insertion of through-thickness fibres into the laminated material. Various techniques have been developed for the insertion of such reinforcing fibres.

One method for inserting through-thickness reinforcing fibres into the laminated material is stapling or z-pinning. These reinforcing fibres are generally fibrous in structure and may be formed with a 45° chamfer at the insertion end. Through-thickness reinforcing fibres are intended to resist shear forces so as to improve the inter-laminar strength and fracture toughness.

The reinforcing fibres may be inserted into laminated material which is pre-impregnated with the matrix material. Once the reinforcing fibres have been inserted into the laminated material, the laminated material and matrix combination can then be cured in order to form a consolidated composite material. The composite material may then, with or without further processing, form composite components.

Inserting the through-thickness reinforcing fibres through the pre-impregnated material is easier, and causes less damage to the reinforcing fibres, if the matrix material has an appropriately low viscosity. The viscosity should be such that the reinforcing fibre can be inserted, but that the matrix material surrounding the layers making up the laminated material is retained.

Figure 6:
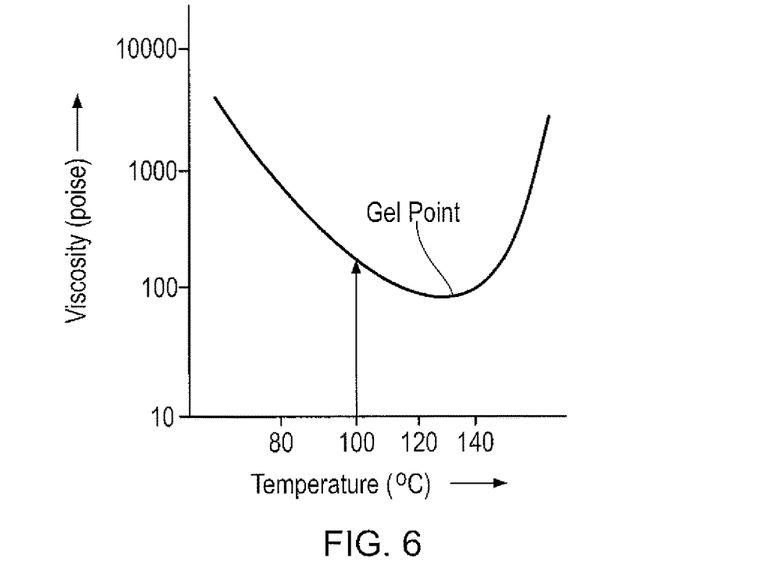
FIG. 6 shows a plot of dynamic viscosity vs. temperature for a typical epoxy resin used with a laminated material.

FIG. 6, which is a rheology plot (dynamic viscosity vs. temperature) for a typical epoxy resin material that might be used in a laminated composite material, shows how this can be achieved by heating the pre-impregnated laminated material enough that the reinforcing fibres can be inserted through the softened matrix material. It can be seen from FIG. 6 that, by heating the laminated material, the dynamic viscosity of the epoxy resin will be considerably lower than at room temperature. This reduction in viscosity greatly aids the process of inserting the reinforcing fibres.

However, the heating process presents challenges as, usually, many thousands of reinforcing fibres are required in order to manufacture a suitably strong composite component.

One option is to heat the pre-impregnated laminated material just enough that the matrix material does not reach its gel point. The gel point is the temperature at which the curing process begins and the matrix material will begin to harden. The gel point is shown in FIG. 6 as the inflection point of the rheology plot, i.e. the point where the reduction in viscosity induced by heating ceases and further heating causes a rapid increase in viscosity as the material starts to cure or harden. Once begun, the curing process cannot be reversed.

Keeping the matrix material below its gel point may be achieved by cycles of heating and cooling the laminated material as the many reinforcing fibres are inserted. This need to keep the laminated material cool enough adds considerable time and complexity to the manufacturing process. It can also therefore, be a process which consumes a large amount of energy. Taken alone, the process of heating the laminated material so that the matrix material is uniformly softened can be time consuming.

Another option is to heat the pre-impregnated laminated material to a known temperature having a corresponding known and finite time-interval until the matrix material reaches its gel point. Once this temperature is reached, all the reinforcing fibres, which are to be inserted, must be in place before the matrix material begins to harden. It follows that, by reinforcing the laminated material in this way, there is limited scope for correcting production errors in the insertion process as once begun the curing process cannot be stopped.

OBJECTS AND SUMMARY

What is needed is a process where the reinforcing fibres can be inserted in a systematic and timely manner, yet independently of the curing process, which in turn can then remain uncompromised by the insertion of the reinforcing fibres.

According to an aspect, there is provided a method of providing through-thickness reinforcement of a laminated material. The laminated material comprises a matrix material. The method comprises the steps of: providing a laminated material; and creating a locally heated zone in the laminated material so as to locally soften the matrix material by focussing a set of at least two energy beams (for example two or more than two energy beams) on a focal zone which corresponds to a location where through-thickness reinforcement is required. The method comprises inserting a reinforcement element through the thickness (for example through at least a part of the thickness) of the laminated material at the location of the locally heated zone to through-thickness reinforce the laminated material.

There is also provided a component manufactured at least in part using the method of providing through-thickness reinforcement of a laminated material.

The use of at least two energy beams may allow the strength of each individual beam to be set at a level that, on its own, would not sufficiently heat and/or soften the laminated material. Thus, in regions that are only exposed to one of the energy beams, the laminated material may not be heated sufficiently to be significantly softened and/or such regions may remain at a temperature significantly below the gel point/curing temperature.

In this way the volume of the laminated material that is heated is minimised. This reduces the amount of energy required to through-thickness reinforce the laminated material. Additionally, a significant time saving can be made during manufacture. The need to provide heating and cooling cycles for the laminated material is minimised or eliminated altogether. The insertion of the reinforcing elements may be achieved entirely independently of the final curing process necessary to create the ultimate composite material. Furthermore, local heating lessens the likelihood that the gel point of the matrix material is inadvertently reached during the insertion of the reinforcing element, which would cause the matrix material to prematurely harden.

The focal zone at which the at least two (that is, two or more) energy beams are focussed may be referred to as a focal point.

The method of through-thickness reinforcing a laminated material may have any one of or, to the extent that they are compatible, any combination of the following features.

The reinforcing element may be formed from the group comprising boron, carbon, glass, silicon carbide, aluminium oxide, aluminium nitride, rigid phenolics, rigid polyimides, rigid epoxies, metal, nylon and composites of such materials.

The reinforcing element may be formed from a material which is compatible with the matrix of the laminated material.

In one embodiment of the invention, the reinforcing element is formed as a parallel sided cylinder or fibre. In other embodiments, the element may have other geometries such as, for example, a tapered or other shaped cylinder and/or may be fluted or ribbed.

The step of creating the locally heated zone in the laminated material may be by focussing a set of more than two energy beams on the focal zone. This may allow the energy of each individual energy beam to be reduced still further.

The energy beams may be emitted from energy beam emitters.

The step of creating the locally heated zone may include creating an array of locally heated zones by focussing a corresponding array of sets of energy beams on a corresponding array of focal zones at locations where through-thickness reinforcing is required and the step of inserting a reinforcement element may include inserting a plurality of reinforcing elements through the thickness of the laminated material at the locations corresponding to the array of locally heated zones.

Any suitable number of reinforcing elements may be inserted into the laminated material. For example, many thousands of reinforcing elements may be inserted into the laminated material.

The array of sets of energy beams and the corresponding array of focal zones may be arranged linearly in a row.

The method may include a step, which follows the step of inserting of the plurality of reinforcing elements, of translating the laminated material relative to the array of sets of energy beams and the corresponding array of focal zones to another set of locations where through-thickness reinforcing is required. Thus, another set of the reinforcing elements may then be inserted into the laminated material. The process can then be repeated any suitable number of times to insert the required reinforcing elements (of which there may be many thousands, for example) in the laminated material.

The step of creating the locally heated zone in the laminated material may comprise forming a full-thickness heated zone that penetrates through the entire thickness of the laminated material.

The method may include the step of forming a hole in the locally heated zone in the laminated material and then performing the step of inserting the reinforcing element by inserting the reinforcing element into the hole. The hole may be formed by a needle.

The steps of creating the locally heated zone in the laminated material and inserting the reinforcing element through the thickness of the laminated material may be performed at substantially the same time. Where a step of forming a hole in the locally heated zone in the laminated material is employed, this may be performed at substantially the same time as creating the locally heated zone. The heating process may be started and stopped slightly before or after the inserting process, for instance depending on the need for effective insertion of the reinforcing fibre. For example, the heated zone may be formed slightly prior to commencing the insertion of the reinforcing element.

The reinforcing element may have a tip and the step of creating the locally heated zone in the laminated material may include the focal zone tracking the tip of the reinforcing element (or, where used, a hole-forming tool) as it is inserted such that the locally heated zone remains ahead of the tip as the reinforcing element is inserted through the thickness of the laminated material. In this way, further manufacturing time savings may be made and therefore energy usage is further reduced. With less energy being imparted to the matrix material, the risk of elevating its temperature too close to its gel point is further minimised.

The energy beams may be microwaves. The microwaves may be emitted by microwave emitters The step of creating the locally heated zone may comprise restricting the locally heated zone from reaching a temperature corresponding to the gel point of the matrix material.

The matrix material may comprise a polymeric matrix material. The polymeric matrix material may be a thermosetting material, such as an epoxy resin. Alternatively, the matrix material may be a thermoplastic material.

The insertion of the reinforcing element may be assisted by hammering. The reinforcing element may be inserted by hammering. The hammering may be ultrasonic hammering.

The insertion of the reinforcing element may be assisted by rotating or twisting of the reinforcing element.

The method may include the step of curing the through-thickness reinforced laminated material to form a composite material. The curing may be by heating the laminated material to its gel temperature in order to cure the matrix material and consolidate it into a composite material.

Any suitable curing technique may be used. For example, a conventional curing technique may be used. By way of example, the curing may be ultra-violet curing, autoclave, or out-of-autoclave curing.

The manufactured composite material may be utilised to form a gas turbine engine component. The manufactured composite material may be utilised to form a gas turbine engine fan blade. The method may include the step of forming a gas turbine engine component (such as a fan blade) from the through-thickness reinforced laminated material.

BRIEF DESCRIPTION OF THE DRAWINGS

The invention will now be described, by way of example only, with reference to the accompanying drawings in which.

DETAILED DESCRIPTION OF THE PREFERRED EMBODIMENTS

Figure 1:
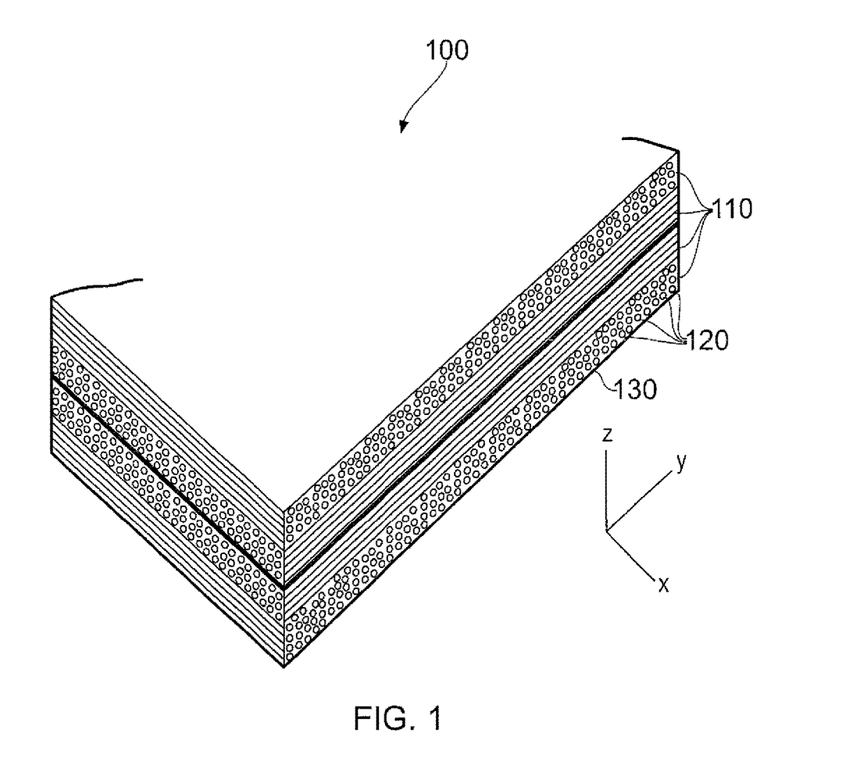
FIG. 1 shows a schematic, partial section view of a laminated material.

FIG. 1 shows an example of a laminated material 100 comprising a plurality of fibre layers 110. In this instance, each of the fibre layers 110 comprises a plurality of uni-directionally aligned fibres 120 held within a matrix material 130. The uni-directionally aligned fibres 120 may comprise tows laid as tape which combine to form one layer. Alternatively, the fibre layers 110 may be woven from fibre tows in the manner of a woven fabric.

The matrix material 130 is pre-impregnated in each of the fibre layers 110 before the layers 110 are laid-up to form the thickness of laminated material 100. Once the structure of the laminated material 100 is complete the matrix material 130 will be cured so that the fibre layers 110 and the matrix material 130 consolidate to form a solid composite material. It is expected that the most suitable matrix material 130 will be a polymeric matrix material. For example, an epoxy resin is particularly favoured as the polymeric matrix material. However, these matrix materials are given by way of example only, and any other suitable matrix material may be used.

It can be seen in the example of FIG. 1 that alternate fibre layers 110 are laid up approximately perpendicular to one another, but as mentioned above, the fibre layers 110 may comprise fibres having other orientations. The relative fibre orientation of each of the layers 110 together with the quantity of fibre layers 110 may be determined by the design loads to which the finished component is to be subjected.

In the example of FIG. 1 the fibre layers 110 of one orientation lie along the X direction while those of the alternate orientation lie along the Y direction. In order to through-thickness reinforce the laminated material 100 then a plurality of reinforcing elements 140 need to be inserted in the Z direction. For this reason, through-thickness reinforcement may be referred to as z-pinning. Many thousands of reinforcing elements 140 may be required for some composite components manufactured from the laminated material 100.

The reinforcing element 140 may consist of a single fibre or parallel sided cylinder. Alternatively, the reinforcing element 140 may consist of a bundle of fibres.

Figure 2:
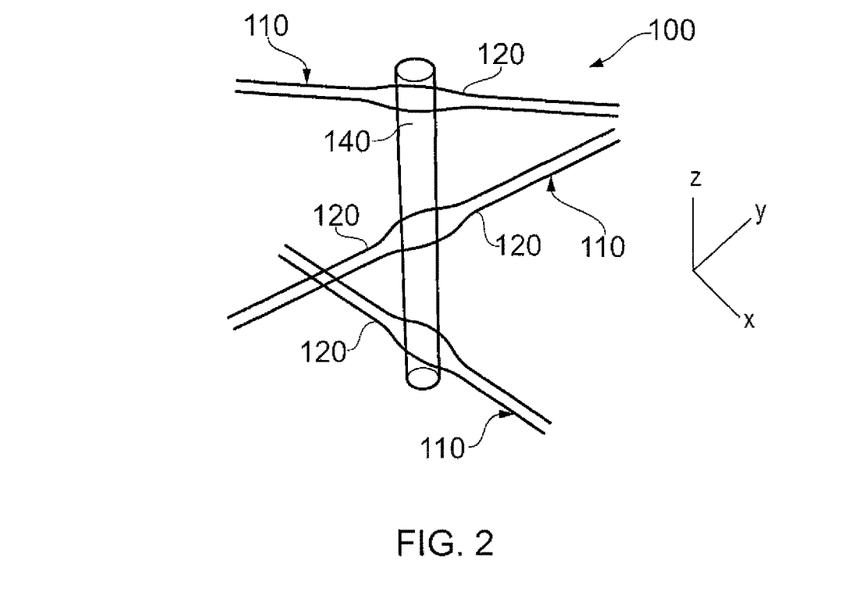
FIG. 2 shows a detailed perspective view of through-thickness reinforcing of the laminated material of FIG. 1.

FIG. 2 shows the structure of the laminated material 100 where it has been through-thickness reinforced by one of the reinforcing elements 140 inserted through the thickness of the cumulative fibre layers 110 in the Z direction. FIG. 2 shows how the inserted reinforcing elements 140 force apart the aligned fibres 120 at the point of insertion on each successive layer 110. In order to be inserted, the reinforcing elements 140 must pass through the matrix material 130 that is pre-impregnated in each of the fibre layers 110.

Figure 3:
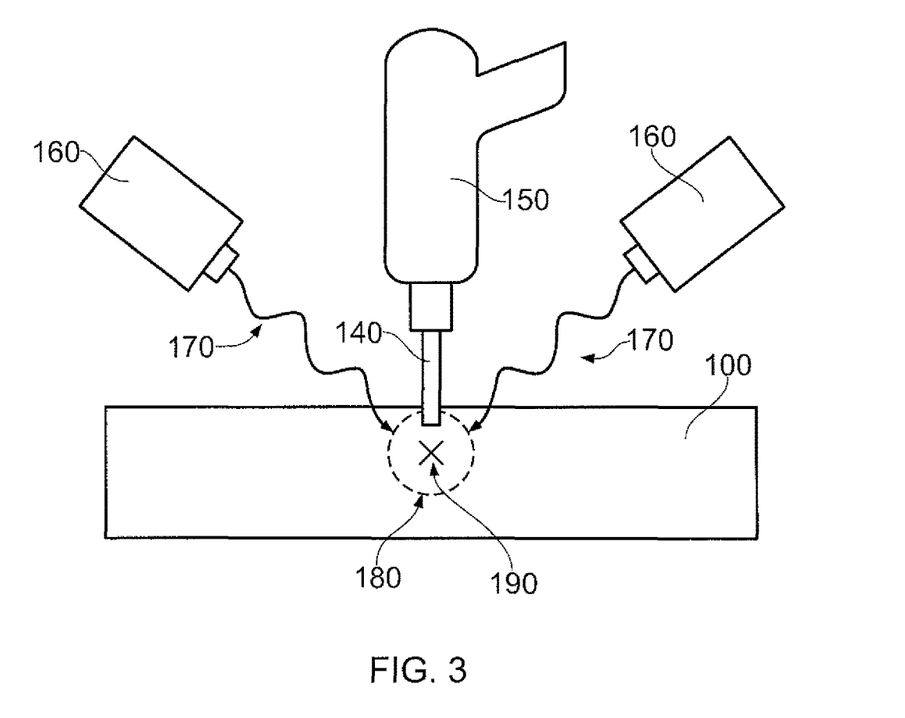
FIG. 3 shows one example of the insertion of a reinforcing element into a laminated material according to the method of the present invention.

FIG. 3 illustrates an example of a method of inserting a reinforcing element 140 using local heating of the laminar material 100. By applying force at one of its ends, the reinforcing element 140 is inserted into the laminate material 100. This may be achieved, for example, by a hammering tool 150. The hammering tool 150 may be an ultrasonic hammering tool. Other methods of applying the appropriate level of force to the reinforcing element 140 may be suitable.

Two energy beam emitters 160 are provided that emit corresponding energy beams 170 intersecting at a focal zone 190. The energy beams 170 are suitably powerful enough that, when focussed together at the focal zone 190, they cause a locally heated zone 180 to form in the laminated material 100. The local heating at the heated zone 180 corresponds to the desired insertion location of the reinforcing element 140. By tuning the energy emitters 160 to a suitable power level, the beams 170 will soften the matrix material 130 at the focal zone 190 (or heated zone 180) so as to ease the insertion of the reinforcing element 140 though the thickness of the laminated material 100.

The remaining bulk of the laminated material 100 is relatively unheated. The local heating 180 at the focal zone 190 is kept to the minimum elevation of temperature necessary to insert the reinforcing element 140 without reaching the gel point. For example, if using the matrix material 130 having the properties according to the plot shown in FIG. 6, then the temperature may be kept below approximately 120° C.

In order to provide the appropriate level of local heating in the laminated material 100 it may be preferable to provide more than two energy beam emitters 160 emitting corresponding energy beams 170 intersecting at the focal zone 190. There could be, for example, three energy beam emitters 160 providing three corresponding energy beams 170 focussed on the focal zone 190. Any practical number of energy beam emitters 160 may be used.

One example of suitable energy beams 170 are microwaves. The energy beam emitters 160 would therefore be microwave emitters. The two or more microwaves are focussed at the focal zone 190 and provide the local heating 180 of the laminated material 100 at the desired insertion location of the reinforcing element 140.

Any suitable type of energy beam 170 may be used, however. By way of further example, an ultrasonic energy beam 170 may be used.

FIG. 3 shows that, for example only, the local heating zone 180 extends partially through the thickness of the laminated material 100. In this instance, approximately a half of the through thickness is heated. Alternatively, the entire thickness of the laminated material 100 may be locally heated at the desired location of the reinforcing element 140. Through thickness local heating of the laminated material 100 may be particularly desirable when a hole is to be formed through the thickness of the laminated material 100. Prior forming of a hole, into which the reinforcing element 140 may then be inserted, can ease insertion and help prevent damage to the reinforcing element 140.

In another variant of the insertion method, the focal zone 190 of the energy beams 170 may track the progress the reinforcing element 140 as it is inserted through the laminated material 100. Progress of a tip 200, of the reinforcing element 140, through the laminated material 100 is shown, by way of example, in FIGS. 4(a) and 4(b). It can be seen the focal zone 190 is advanced ahead of the tip 200 of the reinforcing element 140 as it is inserted through the laminated material 100. Thus, the local heating zone 180 precedes, and is therefore continuously located in front of, the tip 200 as it is inserted through the laminated material 100.

Figure 4A:
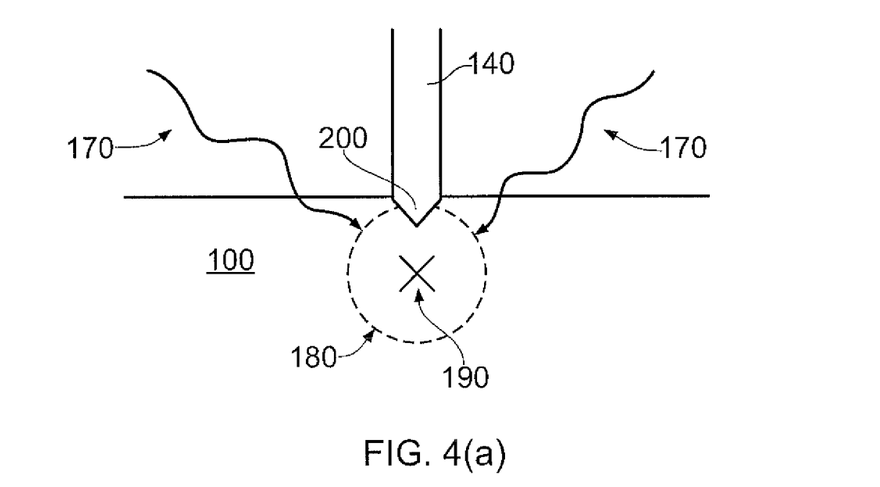
FIG. 4(a) illustrates a further example of the insertion a reinforcing element according to the method of the present invention.
Figure 4B:
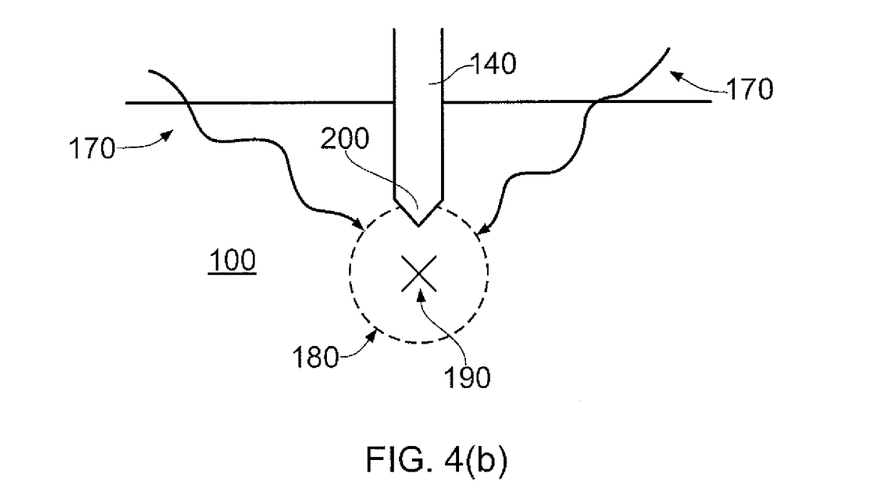
FIG. 4(b) illustrates a further example of the insertion a reinforcing element according to the method of the present invention.

FIG. 4(a) shows the reinforcing element 140 immediately following the entry of the tip 200 into the laminated material 100. In FIG. 4(b), where the reinforcing element 140 has been partially inserted into the laminated material 100, it can be seen that the focal zone 190 has advanced with the reinforcing element 140 so that the resulting heated zone 180 remains ahead of the tip 200.

As the tip 200 of the reinforcing element 140 is in proximity to the focal zone 190, care must be taken to ensure that the tip 200 is not damaged by the focussed energy beams 170 during insertion The advantage of tracking the tip of the reinforcing element 140 in this way is that the heating zone 180 may be relatively smaller than that required to soften the entire thickness of the laminated material 100. Consequently, even less energy may be required by the insertion process and the amount of heat transferred to the matrix material 130 may be further reduced to the minimum required to insert the reinforcing element 140. Thus, the risk of elevating the matrix material 130 too close to its gel point is further minimised and more time may be available to complete the insertion process of the many reinforcing elements 140 which are normally required.

As mentioned above, in order to produce a suitably robust final composite component, many thousands of reinforcing elements 140 may be required in the laminated material 100. It is expected therefore that, in the interests of efficiency, many reinforcing elements 140 will be inserted at the same time. To achieve this there may be an array of the energy beam emitters 160. The plurality of energy beam emitters 160 may be arranged in groups where each of the groups provides a single focal zone 190 of the emitted energy beams 170. The single focal zone 190 of each group of emitters 160 corresponds to the desired location of one of the reinforcing elements 140. Thus, multiple reinforcing elements 140 may be inserted in a single step at the location of each of the focal zones 190. The whole array of emitters 160 can then be moved relative to the laminated material 100 and a new set of reinforcing elements 140 inserted.

Figure 5:
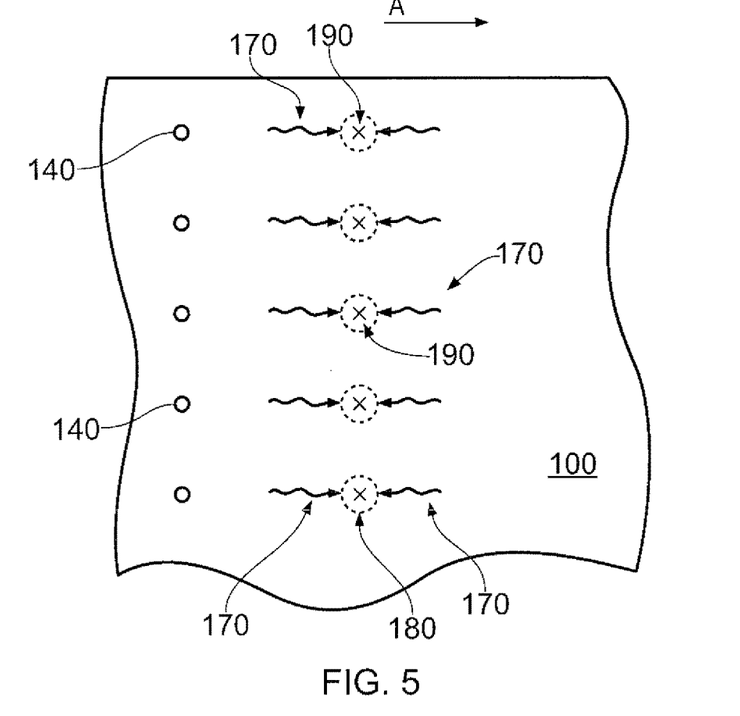
FIG. 5 shows an example of manufacturing a through thickness laminated material according to the method of the present invention.

An example of manufacturing a through thickness laminated material utilising such an arrangement is shown in FIG. 5. In this example, a row of grouped emitters 160 (not shown) emit corresponding groups of energy beams 170. A resulting row of locally heated zones 180 in the laminated material 100 is formed at the location of the focal zones 190 of the groups of energy beams 180. The row of heating zones 180 corresponds to the desired location of the row of reinforcing elements 140. Once the row of reinforcing elements 140 has been inserted the whole row of grouped emitters may be translated (relative to the laminated material 100) in the direction of arrow A and a new row of the reinforcing elements 140 may be inserted into the laminated material 100.

Once the laminated material 100 has been through-thickness reinforced it may be cured so that the matrix material 130 hardens and consolidates the laminations into a solid composite material. Preferably, this is achieved by heating the material to its gel point so that the reaction in the matrix material 130 becomes exothermic and hardens. However, other methods of curing may be used, for instance ultraviolet curing. The heating process may be carried out in a mould that provides the final shape to the composite material. Some finishing processes may be required to complete the eventual composite component.

This method of through-thickness reinforcing a laminated material is particularly applicable and useful in the manufacture of composite components for gas turbine engines. In particular, the method is applicable to the manufacture of fan blades for gas turbine engines where weight and strength of the blades is of particular design concern.

The present invention may be embodied in other specific forms without departing from its spirit or essential characteristics. The described embodiments are to be considered in all respects only as illustrative and not restrictive. The scope of the invention is therefore indicated by the appended claims rather than by the foregoing description. All changes which come within the meaning and range of equivalency of the claims are to be embraced within their scope.

I claim:

1. A method of providing through-thickness reinforcement of a laminated material including a matrix material, comprising the steps of:
   providing a laminated material;
   before insertion of any articles into the laminated material, creating a locally heated zone in the laminated material so as to locally soften the matrix material by focusing a set of at least two energy beams on a focal zone which corresponds to a location where through-thickness reinforcement is required;
   forming a hole at the locally heated zone in the laminated material;
   inserting a reinforcement element into the hole; and
   assisting insertion of the inserted reinforcement element through the thickness of the laminated material by applying a force to a first end of the inserted reinforcement element to through-thickness reinforce the laminated material.

2. The method according to claim 1, wherein the step of creating the locally heated zone in the laminated material is by focusing a set of more than two energy beams on the focal zone.

3. The method according to claim 1, wherein
   the step of creating the locally heated zone includes creating an array of locally heated zones by focusing a corresponding array of sets of energy beams on a corresponding array of focal zones at locations where through-thickness reinforcing is required; and
   the step of inserting a reinforcement element includes inserting a plurality of reinforcing elements through the thickness of the laminated material at the locations corresponding to the array of locally heated zones.

4. The method according to claim 3, wherein the array of sets of energy beams and the corresponding array of focal zones are arranged linearly in a row.

5. The method according to claim 3, further comprising a step, which follows the step of inserting of the plurality of reinforcing elements, of translating the laminated material relative to the array of sets of energy beams and the corresponding array of focal zones to another set of locations where through-thickness reinforcing is required.

6. The method according to claim 1, wherein the step of creating the locally heated zone in the laminated material comprises forming a full-thickness heated zone that penetrates through the entire thickness of the laminated material.

7. The method according to claim 1, wherein the steps of creating the locally heated zone in the laminated material and inserting the reinforcing element through the thickness of the laminated material are performed at substantially the same time.

8. The method according to claim 7, wherein the reinforcing element has a tip and the step of creating the locally heated zone in the laminated material includes the focal zone tracking the tip of the reinforcing element as it is inserted such that the locally heated zone remains ahead of the tip as the reinforcing element is inserted through the thickness of the laminated material.

9. The method according to claim 1, wherein the energy beams are microwaves.

10. The method according to claim 1, wherein the step of creating the locally heated zone comprises restricting the locally heated zone from reaching a temperature corresponding to the gel point of the matrix material.

11. The method according to claim 1, wherein the matrix material comprises a polymeric matrix material.

12. The method according to claim 1, further including a step of curing the through-thickness reinforced laminated material to form a composite material.

13. A method of providing through-thickness reinforcement of a laminated material including a matrix material, comprising the steps of:
providing a laminated material;
creating a locally heated zone in the laminated material so as to locally soften the matrix material by focusing a set of at least two energy beams on a focal zone which corresponds to a location where through-thickness reinforcement is required;
forming a hole at the locally heated zone in the laminated material with a hole-forming tool;
after the hole is formed, inserting an insertion member through the thickness of the laminated material at the location of the locally heated zone,
wherein the focal zone is advanced ahead of the hole-forming tool as the hole-forming tool is inserted through the laminated material.

14. The method according to claim 13, wherein the insertion member comprises a reinforcement member inserted through the laminated material to through-thickness reinforce the laminated material.

15. The method of claim 13, further comprising assisting insertion of the inserted insertion member by hammering the insertion member.

16. A method of providing through-thickness reinforcement of a laminated material including a matrix material, comprising the steps of:
providing a laminated material;
before insertion of any articles into the laminated material, creating a locally heated zone in the laminated material so as to locally soften the matrix material by focusing a set of at least two energy beams on a focal zone which corresponds to a location where through-thickness reinforcement is required; and
inserting a reinforcement element through the thickness of the laminated material at the location of the locally heated zone to through-thickness reinforce the laminated material,
wherein the reinforcement element includes a first end and a second opposite end, and
wherein the step of inserting the reinforcement element comprises applying a force to the first end of the reinforcement element such that the second end penetrates the laminated material.

* * * * *